United States Patent
Park et al.

(10) Patent No.: US 7,616,661 B2
(45) Date of Patent: Nov. 10, 2009

(54) APPARATUS FOR TRANSMITTING/RECEIVING A BIT STREAM IN A NETWORK AND METHOD THEREFOR

(75) Inventors: Jeong-hoon Park, Seoul (KR); Yung-lyul Lee, Seoul (KR); Dong-seek Park, Suwon (KR); Dae-gyu Bae, Suwon (KR); In-hwan Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 649 days.

(21) Appl. No.: 09/751,848

(22) Filed: Jan. 2, 2001

(65) Prior Publication Data

US 2001/0043615 A1 Nov. 22, 2001

(30) Foreign Application Priority Data

Feb. 26, 2000 (KR) .................................... 00-9624

(51) Int. Cl.
*H04J 3/24* (2006.01)

(52) U.S. Cl. .................. 370/474; 370/230; 370/231; 370/242; 370/251

(58) Field of Classification Search ................ 370/474, 370/231, 251, 242, 247, 248, 252, 230
See application file for complete search history.

(56) References Cited

U.S. PATENT DOCUMENTS

| | | | | |
|---|---|---|---|---|
| 5,463,762 A * | 10/1995 | Morrissey et al. | ............. | 714/49 |
| 5,608,738 A * | 3/1997 | Matsushita | .................. | 714/752 |
| 5,699,521 A * | 12/1997 | Iizuka et al. | ................. | 709/240 |
| 5,832,310 A * | 11/1998 | Morrissey et al. | ............. | 710/71 |
| 5,983,259 A * | 11/1999 | Campbell et al. | ........... | 709/200 |
| 6,058,106 A * | 5/2000 | Cudak et al. | ................. | 370/313 |
| 6,154,780 A * | 11/2000 | Zhu | ............................ | 709/236 |
| 6,295,604 B1 * | 9/2001 | Callum | ........................ | 713/160 |
| 6,388,584 B1 * | 5/2002 | Dorward et al. | ................ | 341/51 |
| 6,392,993 B1 * | 5/2002 | Hamilton et al. | ............. | 370/230 |
| 6,438,603 B1 * | 8/2002 | Ogus | ........................... | 709/233 |
| 6,466,585 B1 * | 10/2002 | Le | ............................... | 370/465 |

(Continued)

FOREIGN PATENT DOCUMENTS

CN 1195937 A 10/1998

(Continued)

OTHER PUBLICATIONS

Reiner Ludwig, Bela Rathonyi, "Link Layer Enhancements for TCP/IP over GSM", Proc. IEEE INFOCOM '99.*

(Continued)

*Primary Examiner*—Ayaz R Sheikh
*Assistant Examiner*—Andrew C Lee
(74) *Attorney, Agent, or Firm*—Sughrue Mion, PLLC

(57) ABSTRACT

An apparatus and method of transceiving a bit stream, by which a video bit stream is stably transmitted by the effective use of two logic channels when communication is established by the two logic channels during transmission of the video bit stream in a communication network, is provided. In this method, a source is encoded into a bit stream using a predetermined type of coding. Then, the encoded bit stream is transmitted to each communication protocol layer, while the header of each communication protocol layer is added to a payload. The header is transmitted separately from the bit stream.

43 Claims, 4 Drawing Sheets

U.S. PATENT DOCUMENTS

| | | | |
|---|---|---|---|
| 6,529,604 B1 * | 3/2003 | Park et al. ...................... 381/22 |
| 6,618,383 B1 * | 9/2003 | Tomlins ................... 370/395.5 |
| 6,678,770 B1 * | 1/2004 | Sutoh ......................... 710/110 |
| 6,680,955 B1 * | 1/2004 | Le .............................. 370/477 |
| 6,697,352 B1 * | 2/2004 | Ludwig et al. .............. 370/349 |
| 6,700,888 B1 * | 3/2004 | Jonsson et al. .............. 370/392 |
| 6,717,947 B1 * | 4/2004 | Ghodrat et al. .......... 370/395.1 |
| 6,728,208 B1 * | 4/2004 | Puuskari ................... 370/230.1 |
| 6,771,659 B1 * | 8/2004 | Parantainen et al. ........ 370/466 |
| 6,788,675 B1 * | 9/2004 | Yang ........................... 370/352 |
| 6,789,123 B2 * | 9/2004 | Li et al. ...................... 709/231 |
| 6,816,471 B1 * | 11/2004 | Ludwig et al. .............. 370/331 |
| 6,839,322 B1 * | 1/2005 | Ashwood Smith .......... 370/235 |
| 6,850,519 B1 * | 2/2005 | Saito et al. .................. 370/389 |
| 6,967,964 B1 * | 11/2005 | Svanbro et al. ............. 370/437 |
| 6,985,722 B1 * | 1/2006 | Snelgrove et al. ........... 455/420 |
| 6,987,777 B1 * | 1/2006 | Cain et al. .................. 370/466 |
| 7,009,940 B2 * | 3/2006 | Vialen et al. ................ 370/252 |
| 7,089,577 B1 * | 8/2006 | Rakib et al. ................... 725/87 |
| 7,145,919 B2 * | 12/2006 | Krishnarajah et al. ....... 370/474 |
| 2002/0001314 A1 * | 1/2002 | Yi et al. ...................... 370/469 |
| 2004/0146212 A1 * | 7/2004 | Kadono et al. .............. 382/236 |

FOREIGN PATENT DOCUMENTS

WO     WO 99/07124     2/1999

OTHER PUBLICATIONS

Yiwei Thomas Hou, Dapeng Wu, Bo Li, Takeo Hamada, Ishfaq Ahmad and H. Jonathan Chao; "A differentiated services architecture for multimedia streaming in next generation Internet"; Computer Networks, Elsevier Science Publishers B.V., Amsterdam, NL. vol. 32, No. 2, Feb. 2002 pp. 185-209.

Lars-Ake Larzon, Mikael Degermark, and Stephen Pink; "Efficient Use of Wireless Bandwith for Multimedia Applications"; Mobile Multimedia Communications, 1999; 1999 IEEE International Workshop on San Diego, Ca., USA Nov. 15-17, 1999; Piscataway, N.J. USA Nov. 15, 1999, pp. 187-193.

* cited by examiner

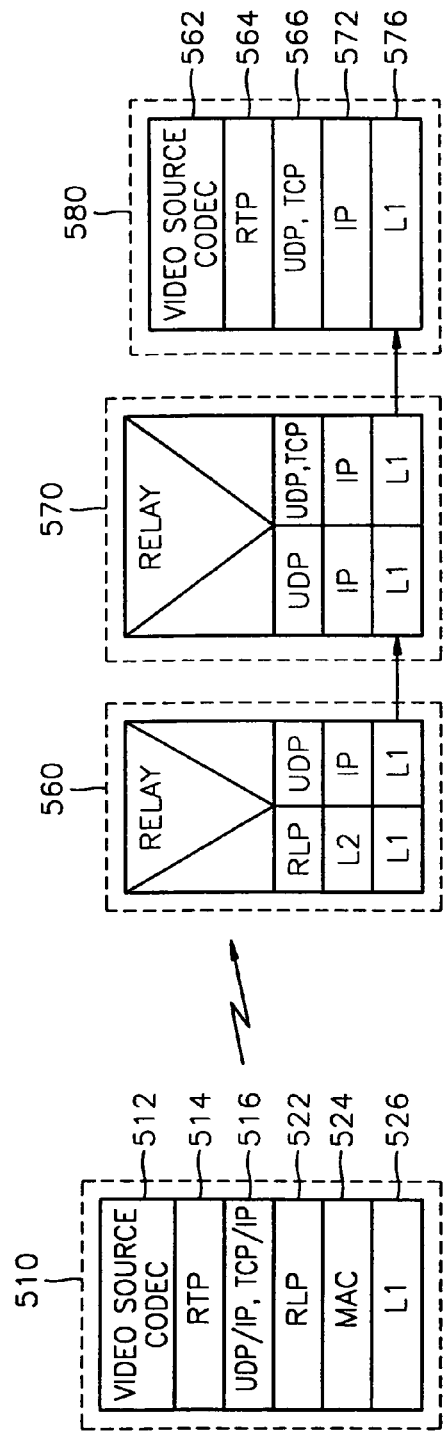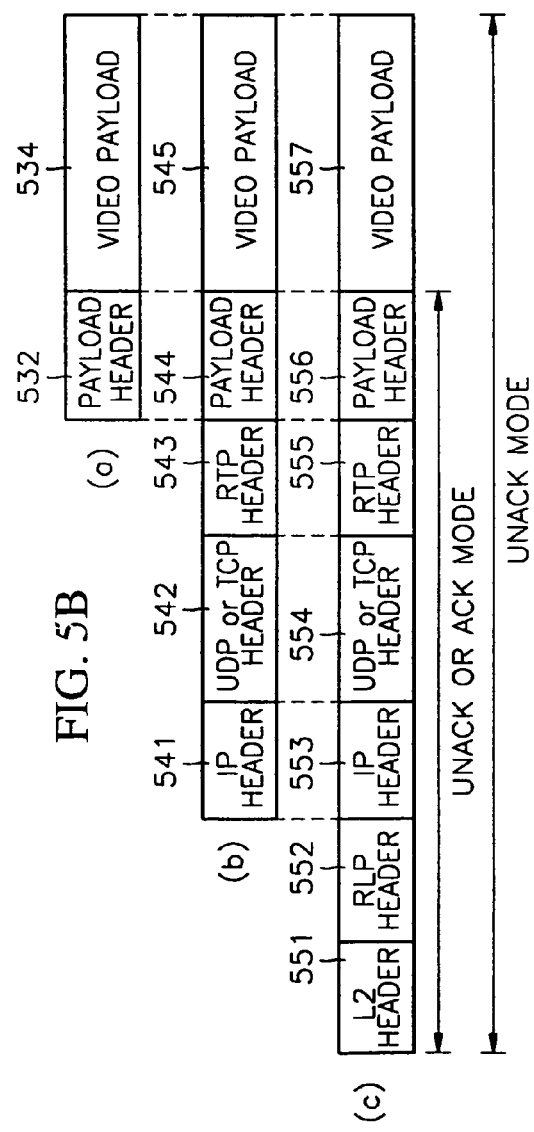

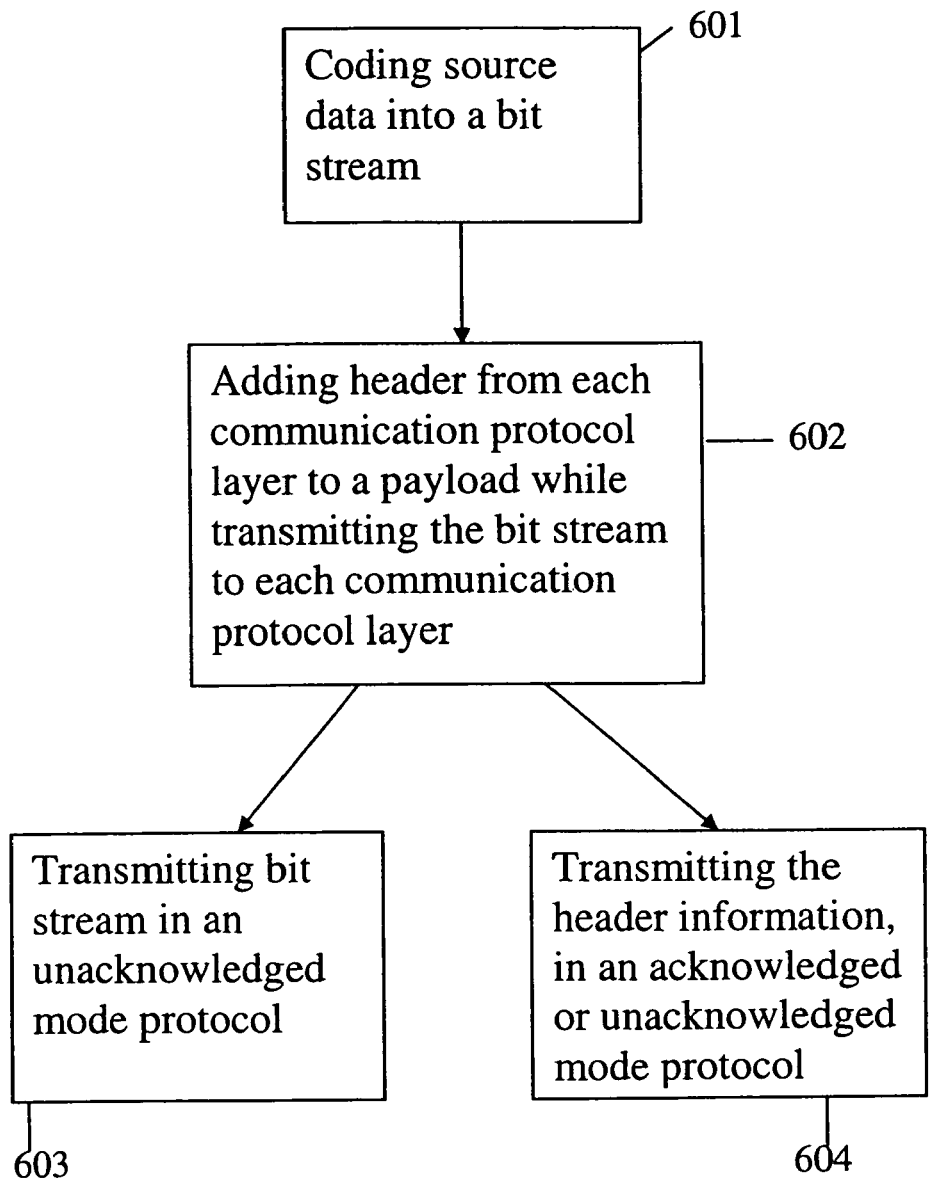

APPARATUS FOR TRANSMITTING/RECEIVING A BIT STREAM IN A NETWORK AND METHOD THEREFOR

BACKGROUND OF THE INVENTION

1. Field of the Invention

The present invention relates to an apparatus for transmitting/receiving a bit stream in a network and a method therefor, and more particularly, to an apparatus for transmitting/receiving a bit stream, by which a video bit stream is stably transferred in a network including a wireless network and an Internet network, and a method therefor. The present application is based on Korean Patent Application No. 00-9624 filed Feb. 26, 2000, which is incorporated herein by reference.

2. Description of the Related Art

In packet networks such as the Internet, typically, two logical ports exist when a channel is set to achieve communication between two locations. That is, a real time protocol (RTP) packet, which has been packetized according to a request for comments (RFC) protocol via the Internet network, is transmitted via the hierarchical structure of a real time protocol/user datagram protocol/Internet protocol (RTP/UDP/IP) or a real time protocol/transmission control protocol/Internet protocol (RTP/TCP/IP).

The RTP/TCP/IP operates in the acknowledge mode and can transmit data stably, so that it usually transmits control information. The RTP/UDP/IP operates in the unacknowledged mode, and transmits video data which usually must be processed in real time.

Referring to FIG. 1, in a transmitting terminal, a video bit stream sequentially undergoes an application layer (video source codec), an RTP layer, an UDP/IP and TCP/IP layer, a radio link protocol (RLP) layer, a layer 2 (L2) and a layer 1 (L1). In each layer, header information is added to the video bit stream, and the video bit stream having header information is transmitted to a network. Here, the TCP transmits control information, and the UDP transmits an RTP packet. In a receiving terminal, the video bit stream undergoes an UDP/IP and TCP/IP layer, an RTP layer and an application layer (video source codec), and is decoded into video data.

FIG. 2 is a view illustrating an embodiment of a typical communication method of transceiving data between a server and a client. First, a server 200 reads a video bit stream produced by a video source codec to divide the read video bit stream into a high priority bit stream 210 and a low priority bit stream 220 before an RTP packet is produced. Next, the server 200 transmits the high priority bit stream 210 to a client 230 via an RTP/TCP/IP, as indicated by arrow 1, and receives an acknowledgment representing that transmission of the high priority bit stream 210 has been completed without error, as indicated by arrow 2. Then the server 200 transmits the low priority bit stream 220 to the client 230 via an RTP/UDP/IP regardless of error as indicated by arrow 3. The client 230 reconstructs the high priority bit stream 210 and the low priority bit stream 220 back into the original video bit stream syntax.

As described above, under a conventional Internet environment, a bit stream produced by video source coding such as MPEG-4 or H.263 is transmitted to the UDP/IP layer. The UDP/IP layer cannot determine when all of the transmitted data has been received since it operates in an unacknowledged mode. If a bit stream packet is transmitted under a communication environment in which an Internet network communicates with a wireless network, the packet data may have bit error under the wireless environment. That is, the bit stream packet may have a loss on the Internet while undergoing the Internet environment and the wireless environment, and bit error may be generated even though the bit stream packet has been transmitted without loss. Here, the bit stream packet includes a packet header and a payload header. If a bit error is included in these headers, the receiving terminal cannot perform suitable decoding.

When a video bit stream is transmitted in real time, the transmitting terminal classifies the video bit stream based on priority, and transmits higher priority packets first and then lower priority packets. At this time, the receiving terminal must delay data until high priority packets are received first. Thus, real time processing of data is difficult. That is, if high priority packets are consecutively transmitted in an Internet network and a wireless network, the network must be continuously stable. Also, if a bit stream is classified according to priority during video source coding, it cannot be reconstructed into a bit stream packet which conforms to a current RFC protocol. Furthermore, the server 200 and the client 230 must always perform a pre-process for classifying a bit stream, according to priority, in order to transmit and receive the bit stream, and a post-process for reconstructing the received higher and lower priority bit streams into the original bit stream. Also, the process for classifying a bit stream based on priority before packetizing can only be performed at a video codec level which has already known the syntax of the video bit stream.

Therefore, data communication in an Internet network combined with a wireless environment causes packet loss and bit error as described above, thus deteriorating the quality of an image.

SUMMARY OF THE INVENTION

An objective of the present invention is to provide a method of transmitting a bit stream, by which a video bit stream is stably transmitted by the effective use of two logic channels when communication is established by the two logic channels during transmission of the video bit stream.

Another objective of the present invention is to provide an apparatus for transceiving a bit stream, by which a video bit stream is stably transceived by the effective use of two logic channels when communication is established by the two logic channels during transmission of the video bit stream.

To achieve the first objective, according to an embodiment of the present invention, there is provided a method of transmitting a bit stream in a communication network, the method including: (a) coding source data into a bit stream using a predetermined type of coding; (b) adding the header of each communication protocol layer to a payload while transmitting the bit stream coded in the step (a) to each communication protocol layer; and (c) transmitting the header separately from the bit stream received from the step (b).

To achieve the first objective, according to another embodiment of the present invention, there is provided a method of transmitting a bit stream in a communication network, the method including: (a) coding source data into a bit stream using a predetermined type of coding; and (b) adding the header of each communication protocol layer to a payload while transmitting the bit stream coded in the step (a) to each communication protocol layer, and separately transmitting the payload and the header.

To achieve the second objective, according to an embodiment of the present invention, there is provided an apparatus for transmitting a bit stream in a communication network, the apparatus including: an encoder for encoding source data into a bit stream using a predetermined type of coding; a protocol processing unit for adding the header of each communication protocol layer to a payload while transmitting the bit stream encoded by the encoder to each communication protocol layer; and a packet processing unit for transmitting the bit stream processed by the protocol processing unit in an unacknowledged mode protocol and transmitting the header information in an acknowledged mode protocol.

To achieve the second objective, according to another embodiment of the present invention, there is provided an apparatus for relaying and receiving a bit stream in a communication network, the apparatus including: an extractor for separately extracting payloads and header information, which corresponds to the header of each layer, while transmitting a bit stream received in a separate transmission protocol in the communication network to each layer; an error determination processing unit for determining whether the header information extracted by the extractor has error, and, if it is determined that the header information has error, requesting re-transmission; a bit stream re-organizing unit for re-organizing a bit stream using the header information extracted by the extractor, if it is determined that the header information has no error; and a decoder for decoding a bit stream re-organized by the bit stream re-organizing unit.

BRIEF DESCRIPTION OF THE DRAWINGS

The above objectives and advantages of the present invention will become more apparent by describing in detail a preferred embodiment thereof with reference to the attached drawings in which:

FIG. 5A is a view illustrating a method of transmitting a video bit stream in a situation where a wireless network communicates with an Internet network;

FIG. 5B is a diagram of a video bit stream formed according to the present invention; and FIG. 6 is a view illustrating a method of transmitting a bit stream, according to the present invention.

DESCRIPTION OF THE PREFERRED EMBODIMENT

MPEG-4 and H.263, which are widely used as video coding methods, include various types of standardized headers. When data is transmitted in a real time protocol (RTP) while undergoing each layer of an Internet protocol or a wireless protocol, the MPEG-4 or H.263 transmission format is used. Accordingly, when one of these video coding methods is used, the header of each layer is added to a payload header. Thus, only when the header of each layer and the payload header are safe from bit error can a receiving terminal perform suitable decoding.

Figure 1:
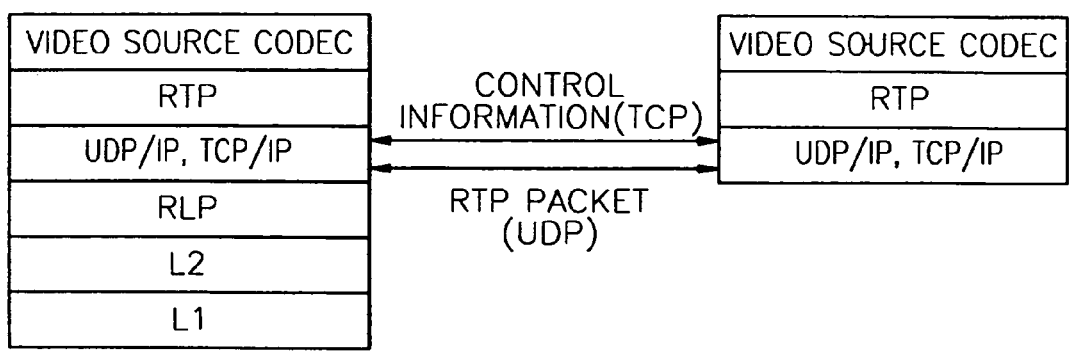
FIG. 1 is a view illustrating a method of transmitting a video bit stream under a H.323 environment.
Figure 2:
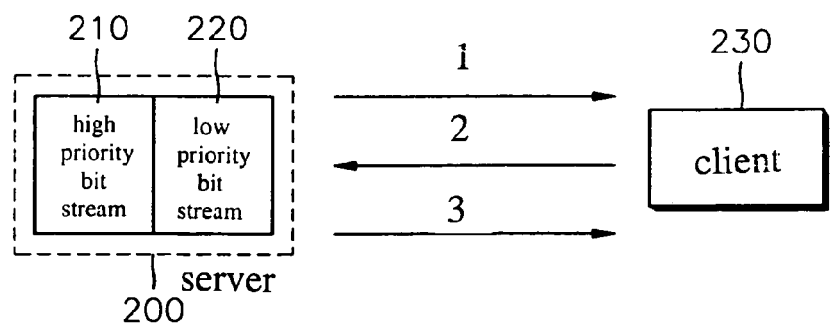
FIG. 2 is a view illustrating a method of transceiving data between a server and a client in a communication network.
Figure 3:
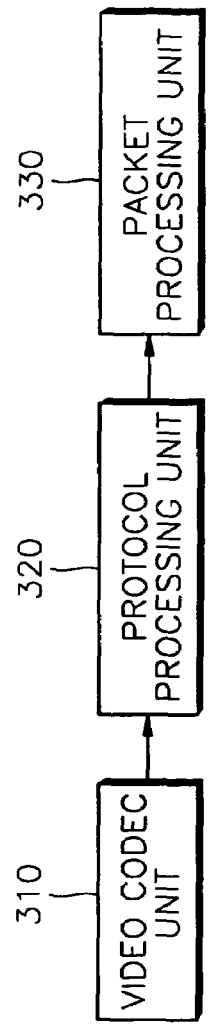
FIG. 3 is a block diagram of a video stream transmitting apparatus according to the present invention.

Referring to FIG. 3, a video codec unit 310 encodes data to a bit stream using an application program such as H.323. A protocol processing unit 320 transfers the bit stream encoded by the video codec unit 310 to each layer of a communication protocol, and simultaneously adds the header of each layer of the protocol to a payload. A packet processing unit 330 packetizes a bit stream processed by the protocol processing unit 320 and transmits the bit stream packet in a user datagram protocol (UDP), which is an unacknowledged mode transmission protocol, and transmits only header information in a transmission control protocol (TCP), which is an acknowledged mode transmission protocol. In another embodiment, the packet processing unit 330 transmits a payload, with a bit stream processed by the protocol processing unit 320, in an unacknowledged mode transmission protocol, and transmits only the added header information in an acknowledged mode transmission protocol.

Figure 4:
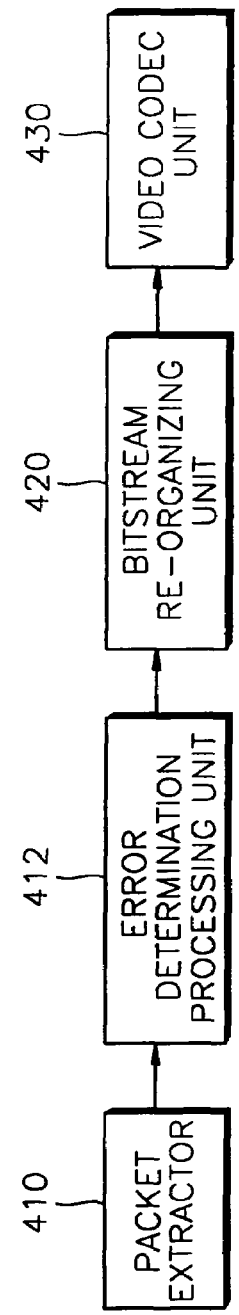
FIG. 4 is a block diagram of an apparatus for relaying and receiving a video stream, according to the present invention.

FIG. 4 is a block diagram of an apparatus for relaying and receiving a video stream, according to the present invention. Referring to FIG. 4, a packet extractor 410 transfers to each layer a bit stream packet received in an unacknowledged or acknowledged mode transmission protocol, while separately extracting a payload and the header of each layer from the bit stream packet. An error determination processing unit 412 determines existence or non-existence of an error in the header information extracted by the packet extractor 410. If it is determined that an error exists in the header information, the error determination processing unit 412 requests re-transmission. On the other hand, if it is determined that there are no errors in the header, a bit stream re-organizing unit 420 re-organizes a video bit stream using the header of each layer extracted by the packet extractor 410. A video codec unit 430 decodes the bit stream re-organized by the bit stream re-organizing unit 420.

FIG. 5A is a view illustrating a method of transmitting a video bit stream in a situation where a wireless network communications with an Internet network. Referring to FIG. 5A, reference numeral 510 indicates a wireless terminal on a transmitting side including several layers, reference numeral 560 indicates a base station including several layers, reference number 570 indicates an inter working function (IWF), including several layers, and reference numeral 580 indicates an Internet terminal on a receiving side including several layers.

First, the wireless terminal 510 includes a video source codec layer 512, which corresponds to an application layer, at the top, and sequentially includes an RTP layer 514, an TCP/IP layer 516, a radio link protocol (RLP) layer 522, a MAC layer 524, a layer 1 (L1) 526. Here, a multimedia codec other than the video source codec can be used as the application layer. A video stream forms a packet made up of a header and a payload while passing through each layer.

The video source codec layer 512 encodes a video source into a video bit stream using a video source coding method such as MPEG-4 or H.263 to form a payload header 532 and a video payload 534 as shown in (a) of FIG. 5B. Here, the payload header 532 and the video payload 534 can be replaced by multimedia data. Then, the RTP layer 514 forms a packet by adding a video payload 545 filled with video data, a payload header 544, and an RTP header 543, the UDP/IP or TCP/IP layer 516 adds an IP header 541 and an UDP or TCP header 542 to the formed packet, as shown in (b). The RLP layer 522 and the MAC, or L2, layer 524 add an RLP header 552 and an L2 header 551, respectively, to the packet (b) as shown in (c).

Next, a video bit stream to which the header of each layer is added is transmitted to the base station 560 including identical layers, through an UDP or TCP. The video bit stream (c), including headers, can be divided into a portion which is transmitted through the UDP, which is an UNACK transmission protocol, and a portion which is transmitted through the TCP, which is an ACK transmission protocol. As described above, the wireless terminal 510 can transmit a video bit stream using the following methods.

FIG. 6 is a view illustrating a method of transmitting a bit stream, according to the present invention. First, source data is coded into a bit stream 601. A header is then added from each communication protocol layer to a payload while the bit stream is transmitted to each protocol layer 602. The bit stream is next transmitted in an unacknowledged mode protocol 603 and the header information is transmitted in an acknowledged or unacknowledged mode protocol 604.

In a first embodiment of the first method, a video bit stream, to which header information is added, is transmitted in the UDP, and the header information is separately transmitted in the TCP. When a bit stream is transmitted only in the UDP, if header information included in the bit stream is damaged, it is difficult for a receiving side to process the bit stream. Hence, in order to prevent the packet loss, the wireless terminal 510 individually packetizes the header of each layer; that is, the L2 header 551, the RLP header 552, the IP header 553, the UDP or TCP header 554, the RTP header 555 and the payload header 556, which are added to a video bit stream after the video bit stream passes through each layer. At the same time or when re-transmission is requested, the wireless terminal 510 stably transmits the packetized headers in a TCP. Here, the data transmitted in the TCP at the request of re-transmission is IP packets or RLP packets.

In a second embodiment of the first method, in order to solve delay that may occur in real time environment, a video bit stream to which header information is added is transmitted in an UDP, and the header information is separately packetized and transmitted in an UDP simultaneously or when re-transmission is requested.

In the second method, according to an embodiment, a video bit stream is separated into a payload portion and a header portion, and these portions are separately packetized. The payload portion is transmitted in an UDP, and simultaneously, the header portion is separately transmitted in a TCP. In another embodiment, the payload portion is transmitted in an UDP, and simultaneously, the header portion is separately transmitted in an UDP. In still another embodiment, in order to reduce a transmission time, a bit stream packet, except for a portion from which a bit error is removed by the TCP layer, can be transmitted to an UDP layer.

In the third method, according to an embodiment, when a bit stream transmitted via the TCP layer is re-transmitted a small number of times, the channel of transmission is determined to be stable to some extent. Accordingly, a small bit stream normally transmitted via the UDP can be transmitted via the TCP.

The base station 560 relays the layers of a wireless protocol, that is, an RLP layer, an L2 and an L1, to the layers of an Internet protocol, an UDP layer, an IP layer and an L1 (or ATM), in order to tunnel a bit stream received from the wireless terminal 510. At this time, when re-transmission is requested, data transmitted in a TCP is re-transmitted in units of IP packets or RLPs.

The IWF 570 relays a bit stream, which has passed through the layers of the base station 560, that is, an UDP layer, an IP layer, and a L1 layer, to an UDP or TCP layer, an IP layer, and a L1 layer, in order to interface with the Internet terminal 580.

The Internet terminal 580, which is a final receiving side, decodes a bit stream received from the IWF 570 through a L1 layer 576, an IP layer 572, an UDP or TCP layer 566, an RTP layer 564, and a video source codec layer 562. The Internet terminal 580 can properly decode a video bit stream which probably has a bit error by using an error resilient tool of video coding and referring to a payload and separately-received header information, when a packet received via the UDP layer has a bit error.

The present invention is not limited to the aforementioned embodiment, and it is apparent that modifications to this particular embodiment may be effected by those skilled in the art without departing from the spirit of the present invention. That is, the present invention can be used when a bit stream is bi-directionally communicated in real time or streamed in a one-way system in a packet network such as an Internet. The present invention can also be applied to a case where an audio source codec other than a video source codec, or a source codec having the same function as the audio source codec has an error resilient tool with respect to a payload or a function which conforms to the error resilient tool; for example, an adaptive multi rate (AMR) for a MPEG-4 audio mobile, an AMR for a universal mobile telephone network (UMTS), a speech codec, and the like.

Also, the above-described embodiment of the present invention can be written in a program that can be executed in computers, and can be realized in general-use digital computers which operate the program from a medium which is used in computers. The medium includes a magnetic storage medium (for example, a ROM, a floppy disc, a hard disc, and the like), an optical read-out medium (for example, a CD-ROM, a DVD and the like), and other computer-readable storage media.

According to the present invention as described above, header information or the like is stably transmitted separately from a payload when a wireless network and an Internet network are linked, so that it can correct and check for bit error of a packet which has been passed through each layer. Also, in contrast with an existing method of transmitting data according to priority, a packet to which the present invention is applied can be processed independently of a video syntax. Furthermore, under an application environment where communication is achieved using an UDP, a bit stream including a bit error can be appropriately decoded by separately-received header information using an error resilient tool.

What is claimed is:

1. A method of transmitting a bit stream in a communication network from a first terminal to a second terminal, the method comprising:
   (a) coding source data into the bit stream using a predetermined type of coding;
   (b) adding a header from each communication protocol layer to a payload while transmitting the bit stream coded in operation (a) to each communication protocol layer; and
   (c) transmitting, from the first terminal to the second terminal, the header separately from the bit stream transmitted in the operation (b),
   wherein in the operation (c), a bit stream, to which header information has been added by undergoing each communication protocol layer, is transmitted in an unacknowledged mode protocol, and only the header information in the bit stream is separately transmitted in an acknowledged mode protocol; and
   wherein, when a number of times of re-transmission of a bit stream transmitted in an acknowledged mode protocol is equal to or less than a predetermined number of times, the bit stream, which has been transmitted in an unacknowledged mode protocol, is transmitted in an acknowledged mode protocol.

2. The method of claim 1, wherein the header information in the bit stream is simultaneously transmitted in an acknowledged mode protocol with the bit stream.

3. The method of claim 2, wherein the acknowledged mode protocol is a transmission control protocol (TCP), and the unacknowledged mode protocol is a user datagram protocol (UDP).

4. The method of claim 2, wherein the acknowledged mode protocol re-transmits Internet protocol (IP) packets or radio link protocol (RLP) packets.

5. The method of claim 1, wherein the header information in the bit stream is simultaneously transmitted in the unacknowledged mode protocol with the bit stream.

6. The method of claim 5, wherein the acknowledged mode protocol re-transmits Internet protocol (IP) packets or radio link layer protocol (RLP) packets.

7. The method of claim 1, wherein, when a transmission error occurs, the bit stream, to which headers have been added by undergoing each communication protocol layer, is re-transmitted in an acknowledged or unacknowledged mode protocol.

8. The method of claim 7, wherein the acknowledged mode protocol re-transmits Internet protocol (IP) packets or radio link protocol (RLP) packets.

9. The method of claim 1, wherein the acknowledged mode protocol is a transmission control protocol (TCP), and the unacknowledged mode protocol is a user datagram protocol (UDP).

10. The method of claim 1, wherein the acknowledged mode protocol re-transmits Internet protocol (IP) packets or radio link protocol (RLP) packets.

11. The method of claim 1, wherein the headers are a payload header, a real time protocol (RTP) header, a user datagram protocol (UDP) or transmission control protocol (TCP) header, an Internet protocol (IP) header, a radio link protocol (RLP) header, and a layer 2 (L2) header, which are added after a bit stream is passed through each layer.

12. The method of claim 1, wherein the payload includes multimedia data.

13. A method of transmitting a bit stream in a communication network, the method comprising:
(a) coding source data into the bit stream using a predetermined type of coding;
(b) adding a header from each communication protocol layer to a payload while transmitting the bit stream coded in the operation (a) to each communication protocol layer; and
(c) separately transmitting the payload and the header,
wherein in the operation (c), a payload in a bit stream, which has passed through each communication protocol layer, is transmitted in an unacknowledged mode protocol, and only the header information is separately transmitted in an acknowledged mode protocol; and
wherein, when a number of times of re-transmission of a bit stream transmitted in an acknowledged mode protocol is equal to or less than a predetermined number of times, the bit stream, which has been transmitted in an unacknowledged mode protocol, is transmitted in an acknowledged mode protocol.

14. The method of claim 13, wherein the header information in the bit stream is simultaneously transmitted in an acknowledged mode protocol with the payload.

15. The method of claim 14, wherein the acknowledged mode protocol is a transmission control protocol (TCP), and the unacknowledged mode protocol is a user datagram protocol (UDP).

16. The method of claim 13, wherein the acknowledged mode protocol is a transmission control protocol (TCP), and the unacknowledged mode protocol is a user datagram protocol (UDP).

17. The method of claim 13, wherein the acknowledged mode protocol re-transmits Internet protocol (IP) packets or radio link protocol (RLP) packets.

18. The method of claim 14, wherein the acknowledged mode protocol re-transmits Internet protocol (IP) packets or radio link protocol (RLP) packets.

19. The method of claim 13, wherein the headers are a payload header, a real time protocol (RTP) header, a user datagram protocol (UDP) or transmission control protocol (TCP) header, an Internet protocol (IP) header, a radio link protocol (RLP) header, and a layer 2 (L2) header, which are added after a bit stream is passed through each layer.

20. The method of claim 13, wherein the payload includes multimedia data.

21. An apparatus for transmitting a bit stream in a communication network, the apparatus comprising:
an encoder for encoding source data into a bit stream using a predetermined type of coding;
a protocol processing unit for adding a header of each communication protocol layer to a payload while transmitting the bit stream encoded by the encoder to each communication protocol layer; and
a packet processing unit for transmitting the bit stream processed by the protocol processing unit in an unacknowledged mode protocol and separately transmitting only header information in an unacknowledged or acknowledged mode protocol;
wherein, when a number of times of re-transmission of a bit stream transmitted in an acknowledged mode protocol is equal to or less than a predetermined number of times, the bit stream, which has been transmitted in an unacknowledged mode protocol, is transmitted in an acknowledged mode protocol.

22. An apparatus for relaying and receiving a bit stream in a communication network, the apparatus comprising:
an extractor for separately extracting payloads and header information, which corresponds to the header of each layer, while receiving a bit stream and a header information received in an acknowledged or unacknowledged mode protocol in the communication network to each layer;
an error determination processing unit for determining whether the header information extracted by the extractor has error;
a bit stream re-organizing unit for re-organizing a bit stream using the header information extracted by the extractor; and
a decoder for decoding a bit stream re-organized by the bit stream re-organizing unit,
wherein only the header information is transmitted in an acknowledged mode protocol; and
wherein, when a number of times of re-transmission of a bit stream transmitted in an acknowledged mode protocol is equal to or less than a predetermined number of times, the bit stream, which has been transmitted in an unacknowledged mode protocol, is transmitted in an acknowledged mode protocol.

23. The apparatus for relaying and receiving a bit stream in a communication network of claim 22, wherein the error determination processing unit also requests re-transmission if it is determined that the header information has error.

24. A computer-readable recording medium having embodied thereon a computer program for performing a method of transmitting a bit stream in a communication network, the method comprising:
(a) coding source data into the bit stream using a predetermined type of coding;

(b) adding a header from each communication protocol layer to a payload while transmitting the bit stream coded in the operation (a) to each communication protocol layer; and (c) transmitting the header separately from the bit stream transmitted in the operation (b), wherein in the operation (c), a bit stream, to which header information has been added by undergoing each communication protocol layer, is transmitted in an unacknowledged mode protocol, and only the header information in the bit stream is separately transmitted in an acknowledged mode protocol; and wherein, when a number of times of re-transmission of a bit stream transmitted in an acknowledged mode protocol is equal to or less than a predetermined number of times, the bit stream, which has been transmitted in an unacknowledged mode protocol, is transmitted in an acknowledged mode protocol.

25. The computer-readable recording medium of claim 24, wherein the header information in the bit stream is simultaneously transmitted in an acknowledged mode protocol with the bit stream.

26. The computer-readable recording medium of claim 25, wherein the acknowledged mode protocol is a transmission control protocol (TCP), and the unacknowledged mode protocol is a user datagram protocol (UDP).

27. The computer-readable recording medium of claim 25, wherein the acknowledged mode protocol re-transmits Internet protocol (IP) packets or radio link protocol (RLP) packets.

28. The computer-readable recording medium of claim 24, wherein the header information in the bit stream is simultaneously transmitted in the unacknowledged mode protocol with the bit stream.

29. The computer-readable recording medium of claim 28, wherein the acknowledged mode protocol re-transmits Internet protocol (IP) packets or radio link protocol (RLP) packets.

30. The computer-readable recording medium of claim 24, wherein, when a transmission error occurs, the bit stream, to which headers have been added by undergoing each communication protocol layer, is re-transmitted in an acknowledged or unacknowledged mode protocol.

31. The computer-readable recording medium of claim 30, wherein the acknowledged mode protocol re-transmits Internet protocol (IP) packets or radio link layer protocol (RLP) packets.

32. The computer-readable recording medium of claim 24, wherein the acknowledged mode protocol is a transmission control protocol (TCP), and the unacknowledged mode protocol is a user datagram protocol (UDP).

33. The computer readable recording medium of claim 24, wherein the acknowledged mode protocol re-transmits Internet protocol (IP) packets or radio link protocol (RLP) packets.

34. The computer-readable recording medium of claim 24, wherein the headers are a payload header, a real time protocol (RTP) header, a user datagram protocol (UDP) or transmission control protocol (TCP) header, an Internet protocol (IP) header, a radio link protocol (RLP) header, and a layer 2 (L2) header, which are added after a bit stream is passed through each layer.

35. The computer-readable recording medium of claim 24, wherein the payload includes multimedia data.

36. A computer-readable recording medium having embodied thereon a computer program for performing a method of transmitting a bit stream in a communication network, the method comprising:

(a) coding source data into the bit stream using a predetermined type of coding;

(b) adding a header from each communication protocol layer to a payload while transmitting the bit stream coded in the operation (a) to each communication protocol layer; and (c) separately transmitting the payload and the header, wherein in the operation (c), a payload in a bit stream, which has passed through each communication protocol layer, is transmitted in an unacknowledged mode protocol, and only the header information is separately transmitted in an acknowledged mode protocol; and wherein, when a number of times of re-transmission of a bit stream transmitted in an acknowledged mode protocol is equal to or less than a predetermined number of times, the bit stream, which has been transmitted in an unacknowledged mode protocol, is transmitted in an acknowledged mode protocol.

37. The computer-readable recording medium of claim 36, wherein the header information in the bit stream is simultaneously transmitted in an acknowledged mode protocol with the payload.

38. The computer-readable recording medium of claim 37, wherein the acknowledged mode protocol is a transmission control protocol (TCP), and the unacknowledged mode protocol is a user datagram protocol (UDP).

39. The computer-readable recording medium of claim 37, wherein the acknowledged mode protocol re-transmits Internet protocol (IP) packets or radio link protocol (RLP) packets.

40. The computer-readable recording medium of claim 36, wherein the acknowledged mode protocol is a transmission control protocol (TCP), and the unacknowledged mode protocol is a user datagram protocol (UDP).

41. The computer-readable recording medium of claim 36, wherein the acknowledged mode protocol re-transmits Internet protocol (IP) packets or radio link protocol (RLP) packets.

42. The computer-readable recording medium of claim 36, wherein the headers are a payload header, a real time protocol (RTP) header, a user datagram protocol (UDP) or transmission control protocol (TCP) header, an Internet protocol (IP) header, a radio link protocol (RLP) header, and a layer 2 (L2) header, which are added after a bit stream is passed through each layer.

43. The computer-readable recording medium of claim 36, wherein the payload includes multimedia data.

* * * * *

UNITED STATES PATENT AND TRADEMARK OFFICE
CERTIFICATE OF CORRECTION

PATENT NO.       : 7,616,661 B2                                                         Page 1 of 1
APPLICATION NO.  : 09/751848
DATED            : November 10, 2009
INVENTOR(S)      : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1254 days.

Signed and Sealed this

Nineteenth Day of October, 2010

David J. Kappos
*Director of the United States Patent and Trademark Office*